United States Patent
Bae

(10) Patent No.: US 9,190,641 B2
(45) Date of Patent: Nov. 17, 2015

(54) RECHARGEABLE BATTERY PACK

(75) Inventor: Sang-Hoon Bae, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 232 days.

(21) Appl. No.: 13/349,711

(22) Filed: Jan. 13, 2012

(65) Prior Publication Data

US 2012/0258335 A1 Oct. 11, 2012

(30) Foreign Application Priority Data

Apr. 7, 2011 (KR) .......................... 10-2011-0032187

(51) Int. Cl.
*H01M 2/10* (2006.01)
*H01M 2/20* (2006.01)
*H01M 10/42* (2006.01)

(52) U.S. Cl.
CPC .............. *H01M 2/105* (2013.01); *H01M 2/204* (2013.01); *H01M 10/425* (2013.01); *H01M 2/1016* (2013.01)

(58) Field of Classification Search
CPC ..... H01M 2/10; H01M 2/105; H01M 10/425; H01M 2/204; H01M 2/1016
USPC ............... 429/7, 99, 100, 149, 151, 156, 159, 429/160, 161
See application file for complete search history.

(56) References Cited

U.S. PATENT DOCUMENTS

| 2007/0148536 A1* | 6/2007 | Kang et al. ...................... 429/99 |
| 2007/0190405 A1* | 8/2007 | Kang et al. ...................... 429/99 |
| 2007/0264562 A1* | 11/2007 | Kang et al. ...................... 429/96 |
| 2009/0184682 A1 | 7/2009 | Kosugi et al. |
| 2010/0047676 A1 | 2/2010 | Park et al. |
| 2011/0003193 A1 | 1/2011 | Park et al. |
| 2012/0028084 A1* | 2/2012 | Park et al. ......................... 429/7 |

FOREIGN PATENT DOCUMENTS

| JP | 2004-031284 A | 1/2004 |
| JP | 2007-149560 A | 6/2007 |
| JP | 2007-213987 A | 8/2007 |
| JP | 2008-124033 A | 5/2008 |
| JP | 2010-108625 A | 5/2010 |
| JP | 2011-014537 A | 1/2011 |
| KR | 10-2007-0060201 A | 6/2007 |
| KR | 10-2008-0013040 A | 2/2008 |
| KR | 10-2009-0027899 A | 3/2009 |
| WO | WO 2010/079938 | * 7/2010 |

OTHER PUBLICATIONS

Korean Office action for KR 10-2011-0032187, dated Aug. 31, 2012 (Bae).
Korean Notice of Allowance dated Mar. 28, 2013.

* cited by examiner

*Primary Examiner* — Jonathan Jelsma
*Assistant Examiner* — Omar Kekia
(74) *Attorney, Agent, or Firm* — Lee & Morse, P.C.

(57) ABSTRACT

A rechargeable battery pack includes a plurality of unit cells adjacent to each other, each unit cell including a rechargeable battery, a case configured to house the unit cells and support side surfaces thereof, and a spacer compressed among the unit cells, the spacer including an elastic material and configured to exert an elastic force to support the unit cells.

17 Claims, 10 Drawing Sheets

RECHARGEABLE BATTERY PACK

BACKGROUND

1. Field

The present disclosure relates to a rechargeable battery pack in which a plurality of unit cells are housed and fixed in a case.

2. Description of the Related Art

A rechargeable battery may include a unit cell or a plurality of electrically connected unit cells depending on the type of device used. For example, a rechargeable battery pack may include a plurality of unit cells, a protection circuit module (PCM) that protects the unit cells, a conductive connection tab that connects the unit cells to the PCM, and a cable. The unit cells may be housed in a case and electrically connected to each other via the conductive connection tab, and the conductive connection tab may be connected to the PCM via the cable.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery pack in which a plurality of unit cells housed in a case are stably fixed.

An exemplary embodiment provides a rechargeable battery pack, including a plurality of unit cells adjacent each other, each unit cell including a rechargeable battery, a case configured to house the unit cells and support side surfaces of the unit cells, and a spacer compressed among adjacent unit cells, the spacer including an elastic material and configured to exert an elastic force to support the unit cells.

The case may include a support corresponding to side surfaces of outermost unit cells, the outermost unit cells being supported by and compressed between the support and the spacer.

The spacer may include first and second compressing portions spaced apart from each other along a first direction, and an elastic portion connecting the first and second compressing portions, the elastic portion including the elastic material and configured to exert the elastic force and to push the first and second compressing portions in opposite directions against adjacent unit cells.

The plurality of unit cells may be arranged in groups of four adjacent unit cells symmetrical with respect to an intersection of the first direction and a second direction orthogonal to the first direction, each of the first and second compressing portions is configured to push away along the first direction two corresponding unit cells of the four adjacent unit cells in a group from the remaining two unit cells of the four adjacent unit cells in the group, and each of the first and second compressing portions is further configured to push the two corresponding unit cells away from each other along the second direction.

The first compressing portion may have a shape of a wedge and is inserted in a gap between first unit cells, the first unit cells being two unit cells of the four unit cells adjacent to each other along the second direction, and the second compressing portion may have a shape of a wedge inserted in a gap between second unit cells, the second unit cells being two unit cells of the four unit cells and adjacent to the first unit cells along the first direction.

The elastic portion may include a first elastic portion and a second elastic portion, the first and second elastic portions being symmetrically spaced apart from each other in the second direction, the first elastic portion may be curved and connects first facing portions of the first compressing portion and the second compressing portion along the first direction, the first elastic portion being convex with respect to a center of the spacer, and the second elastic portion may be curved and connects second facing portions of the first compressing portion and the second compressing portion along the first direction, the second elastic portion being convex with respect to the center of the spacer and curving in an opposite direction with respect to the first elastic portion.

The plurality of unit cells may be arranged in groups of two adjacent unit cells symmetrical with respect to the first direction, and each of the first and second compressing portions may be configured to push the two adjacent unit cells in each group away from each other along the first direction, and to push the two adjacent unit cells in each group in parallel along the second direction, the second direction being orthogonal to the first direction.

The elastic portion may be curved and connects the first compressing portion and the second compressing portion along the first direction, the elastic portion curving away from the unit cells.

The plurality of unit cells may be arranged in groups of two adjacent unit cells symmetrical with respect to the first direction, and each of the first and second compressing portions may be configured to push the two adjacent unit cells in each group away from each other along the first direction.

The elastic portion may include a first elastic portion and a second elastic portion that are symmetrically spaced apart from each other along the second direction orthogonal to the first direction, the first elastic portion may connect first facing portions of the first compressing portion and the second compressing portion along the first direction by a first curve, the first curve being concave with respect to a center of the spacer, and the second elastic portion may connect second facing portions of the first compressing portion and the second compressing portion along the first direction by a second curve, the second curve being concave with respect to the center of the spacer.

The plurality of unit cells may be arranged in pairs, two adjacent unit cells in each pair being symmetrically spaced apart from each other along a second direction, and the spacer a first compressing portion and a second compressing portion, the first and second compressing portions being configured to push the two adjacent unit cells in each pair away from each other along the second direction, and an elastic portion connecting the first compressing portion and the second compressing portion, the elastic portion including the elastic material and being configured to exert the elastic force and to push the first and second compressing portions against the two adjacent unit cells.

The first compressing portion may protrude along the second direction to contact a side surface of one unit cell of the two adjacent unit cells, and the second compressing portion may be connected to the elastic portion and contacts a side surface of another unit cell of the two adjacent unit cells, the second compressing portion contacting two regions of the side surface of the other unit cell, the two regions being symmetrically spaced apart from each other along a first direction and relative to the first compressing portion, the first direction begin orthogonal to the second direction.

The rechargeable battery pack may further include a protection circuit module having a protection circuit of the unit cells, a connection tab electrically connecting the unit cells, and a cable connecting the protection circuit module to the connection tab.

The connection tab may include a plate electrically connected to the unit cells, and a clamp protruding from the plate and clamping the cable.

The clamp may be integral with the plate and protrudes in an upright position on the plate.

At least a portion of the spacer may be positioned between every two adjacent unit cells.

The rechargeable battery pack may further include a support within the case, each unit cell being positioned between a portion of the support and a portion of the spacer.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
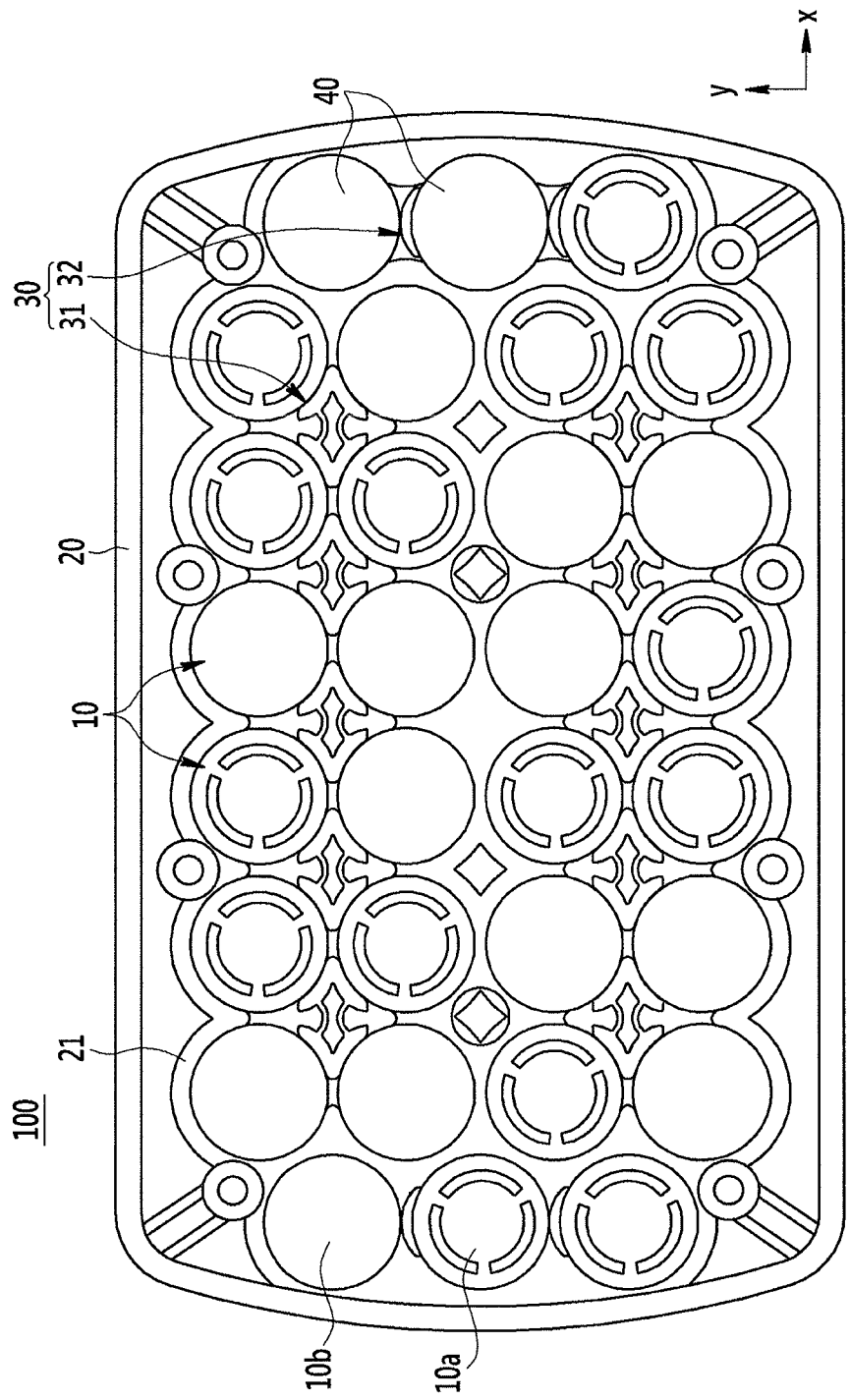
FIG. 1 illustrates a top plan view of a rechargeable battery pack according to a first exemplary embodiment.

Korean Patent Application No. 10-2011-0032187, filed on Apr. 7, 2011, in the Korean Intellectual Property Office, and entitled: "Rechargeable Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when a layer or element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

FIG. 1 is a top plan view of a rechargeable battery pack 100 according to a first exemplary embodiment. Referring to FIG. 1, the rechargeable battery pack 100 of the first exemplary embodiment may include a plurality of unit cells 10 that include rechargeable batteries, a case 20 that houses the unit cells 10 therein, and spacers 30 that elastically support the unit cells 10.

For example, the unit cell 10 may be formed as a cylindrical rechargeable battery. The unit cell 10 may include an electrode group, e.g., formed by winding a positive electrode and a negative electrode with a separator interposed therebetween, a can for storing an electrolyte and the electrode group therein, and a cap assembly sealingly coupled to the can and electrically connected to the electrode group. The unit cell 10 may repeatedly perform charging and discharging functions (not shown).

The case 20 may house the plurality of unit cells 10, e.g., the size of the case 20 may determine the number of unit cells 10 to be contained therein, and may be configured to contain the optimal number of unit cells 10 in a limited space. For example, the case 20 may have an accommodating space, e.g., an interior space, in a shape of a cuboid with an open top.

In order to support, e.g., each side of, the unit cells 10 contained in the case 20, the case 20 may be configured to include a support 21 that houses and partly supports the unit cells 10. For example, the support 21 may be positioned along at least some inner sidewalls of the case 20 to define an open region within the case 20 to place the unit cells 10. The support 21 is arranged to guide the insertion of the unit cells 10 into the case 20 and maximize the number of unit cells 10 housed in the accommodating space of the case 20.

For example, the support 21 may be closely attached to side surfaces of at least most of the unit cells 10. Therefore, when the spacers 30 are inserted into the case 20, the unit cells 10 may be positioned between the support 21 and the spacers 30, so the support 21 supports the unit cells 10 against the elastic force of the spacers 30. For example, as illustrated in FIG. 1, if the unit cells 10 are formed as cylindrical rechargeable batteries, the support 21 may be formed to have cylindrical concave portions in order to correspond to the cylindrical shape of the batteries. In another example, if the unit cells 10 are formed as rectangular rechargeable batteries, the support may be formed to have rectangular concave portions corresponding to the rectangular shape (not shown).

Both sides of the support 21 are formed to be open so that the spacers 30 are inserted from both sides (e.g., top and bottom sides) in the case 20. For example, the support 21 may extend only along the sidewalls of the case 20, so the unit cells 10 and the spacers 30 may be inserted into the open support 21 structure from both sides, e.g., to be surrounded and supported by the support 21 within the case 20. The unit cells 10 may be stably supported because the spacers 30 are inserted from both top and bottom sides. For convenience, FIG. 1 illustrates a structure where the top of the case 20 is open and the spacers 30 are inserted from the top side.

After the unit cells 10 are inserted into the open region of the case 20 defined by the support 21, the spacers 30 may be inserted into the case 20 among adjacent unit cells 10. The spacers 30 may be inserted among the unit cells 10 by forced-fitting, thus pressing the unit cells 10 by their elastic force. Therefore, the unit cells 10 may be supported by the spacers 30 on one side, and supported by the support 21 on the other side. In other words, the unit cells 10 may be positioned between the support 21 and the spacers 30 to be compressed therebetween, thereby being stably fixed by an elastic force generated by the spacers 30.

That is, the spacers 30, e.g., each spacer 30, may include at least one elastic portion, i.e., a portion formed of an elastic material that returns to its original shape after deformation, e.g., the spacer 30 may include a spring. As such, the spacers 30 may be deformed to be inserted into the case 20 among the battery cells 10, i.e., force-fitted, and may exert an elastic force to push against the battery cells 10 and the support 21 once installed in the case 20. As each unit cell 10 may be compressed either between spacers 30 or between a spacer 30 and the support 21, the unit cells 10 may be stably fixed within the case 20 and prevented from being moved by physical impacts. For example, physical impacts applied to the case 20 are alleviated by the spacers 30. Accordingly, the unit cells 10 become stable between the support 21 and the spacers 30, and the rechargeable battery pack 100 may be protected from physical impacts.

The spacers 30 may be formed in singularity or plurality depending on the arrangement structure of the unit cells 10 within the case 20. According to the first exemplary embodiment, the spacers 30 may include first spacers 31 and second spacers 32.

The rechargeable battery pack 100 may include a predetermined number of unit cells 10 within the case 20, e.g., thirty unit cells 10. The unit cells 10 may be arranged to have their positive electrode terminals 10a or negative electrode terminals 10b face the top of the case 20, e.g., the unit cells 10 may be arranged in groups having alternating orientations of their negative/positive electrode terminals 10a/10b. For example, a first group of three unit cells 10 may be arranged adjacent to each other with their positive electrode terminals 10a facing the top of the case 20 (bottom left in FIG. 1), and a second group of three unit cells 10 may be arranged adjacent to each other and to the first group of unit cells 10 with their negative electrode terminals 10b facing the top of the case 20 (top left in FIG. 1). This arrangement may be repeated in the case 20. For convenience of explanation, unit cells arranged in the periphery of the case 20, e.g., along short sidewalls of the case 20, will be referred to hereinafter as unit cells 40, while the remaining unit cells will be referred to hereinafter as unit cells 10. As such, the unit cells 10 at the center of the case 20 are supported by the first spacers 31, and the unit cells 40 along both sidewalls of the case 20 are supported by the second spacers 32.

The first and second spacers 31 and 32 may be used together within one rechargeable battery pack 100, as illustrated in FIG. 1. However, embodiments are not limited thereto and may include first and second spacers 31 and 32 used separately in different rechargeable battery packs. The first and second spacers 31 and 32 will be described hereinafter in more detail below with reference to FIGS. 2-5.

Figure 2:
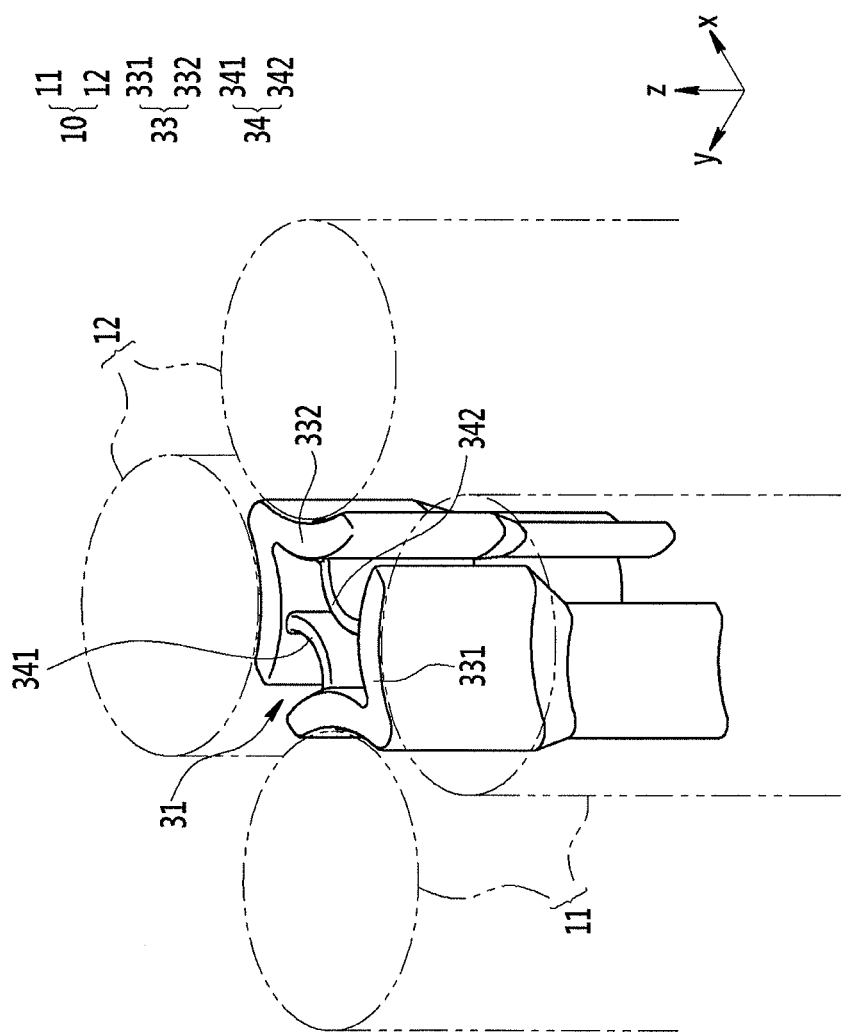
FIG. 2 illustrates an enlarged perspective view of a first spacer coupled to unit cells according to the first embodiment.
Figure 3:
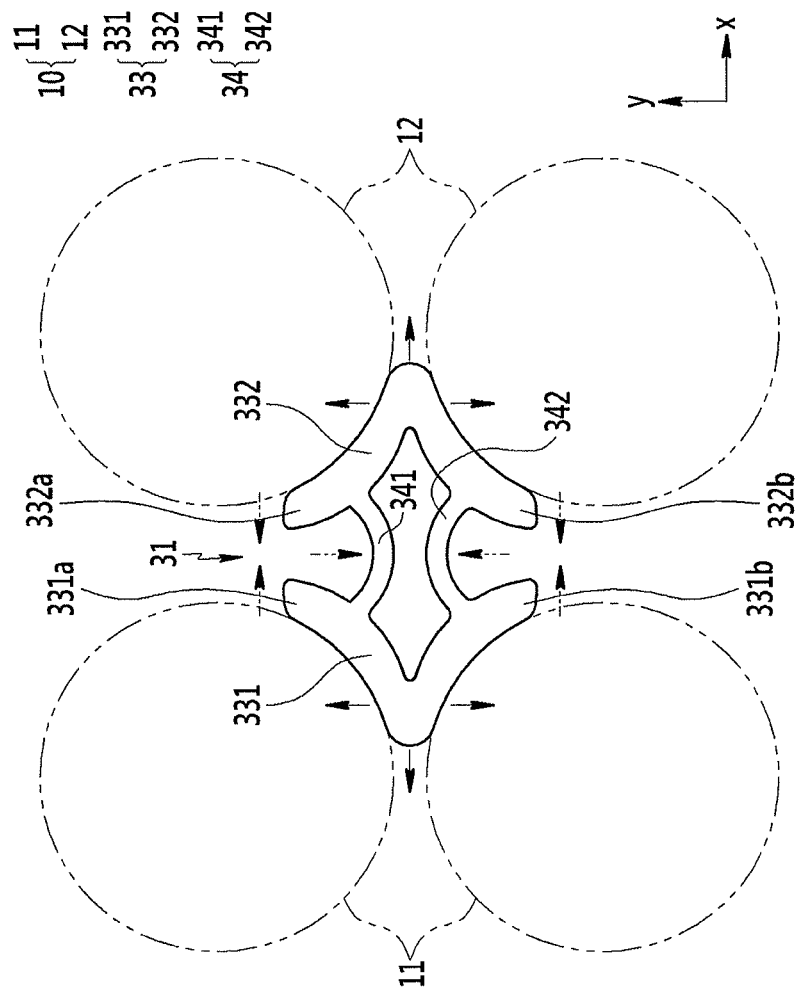
FIG. 3 illustrates a plan view of an operating state of the first spacer shown in FIG. 2.

FIG. 2 is a perspective view of a coupled state of the first spacer 31 among the unit cells 10 of FIG. 1, and FIG. 3 is a view showing an operating state of the first spacer 31 shown in FIG. 2. Referring to FIG. 2 and FIG. 3, the first spacer 31 may include a pair of compressing portions 33 disposed on both sides of a first direction, e.g., spaced apart along the x-axis, to compress the unit cells 10, and an elastic portion 34 to elastically connect the compressing portions 33. A direction perpendicular to the first direction is a second direction, e.g., a direction along the y-axis.

Referring back to FIG. 1, the unit cells 10 may be repeatedly arranged in the case 20, so four unit cells 10 may be arranged at four positions symmetrical with respect to the intersection of the x and y-axis directions. For example, as illustrated in FIGS. 2-3, two first unit cells 11 may be arranged at two of the four positions to form a first pair of unit cells along the y-axis, and two second unit cells 12 may be arranged at the remaining two positions of the four positions to form a second pair along the y-axis. The first and second pairs may be adjacent to each other along the x-axis.

The compressing portions 33 may include a first compressing portion 331 and a second compressing portion 332 that are respectively disposed on both sides of the x-axis direction. That is, the first and second compressing portions 331 and 332 may be positioned along the y-axis, and may be spaced apart from each other along the x-axis. For example, the first and second compressing portions 331 and 332 may be symmetrical to each other about the y-axis. For example, the first compressing portion 331 may substantially have a shape of a wedge that is inserted into a gap between the pair of the first unit cells 11. The second compressing portion 332 may substantially have the shape of a wedge that is inserted into a gap between the pair of the second unit cells 12. Lengths of the compressing portions 33 along the z-axis may be equal to or shorter than lengths of the battery cells 10.

Thus, the first compressing portion 331 presses the first unit cells 11 away from the second unit cells 12 along the x-axis, and, at the same time, presses the pair of first unit cells 11 away from each other along the y-axis. The second compressing portion 332 presses the second unit cells 12 away from the first unit cells 11 along the x-axis, and presses the pair of second unit cells 12 away from each other along the y-axis (see the solid arrows in FIG. 3).

The elastic portion 34 may include a first elastic portion 341 and a second elastic portion 342 that are symmetrically spaced apart from each other in the y-axis direction, such that the first and second compressing portions 331 and 332 press the first and second unit cells 11 and 12. That is, the first and second elastic portions 341 and 342 may extend along the x-axis and be spaced apart along the y-axis.

The first elastic portion 341 connects along the x-axis portions 331a and 332a of the first compressing portion 331 and the second compressing portion 332 that face each other. The first elastic portion 341 may have a curved shape that is convex with respect to the center of the first spacer 31. The second elastic portion 342 connects along the x-axis portions 331b and 332b of the first compressing portion 331 and the second compressing portion 332 that face each. The second elastic portion 342 may have a curved that is convex with respect to the center of the first spacer 31. The first and second elastic portions 341 and 342 may be mirror images of each other.

Accordingly, when the first spacer 31 is inserted among the first and second unit cells 11 and 12, the first and second elastic portions 341 and 342 retract to the center of the first spacer 31 as the first and second compressing portions 331 and 332 retract toward each other (see the dotted arrows in FIG. 3). That is, the deformation of the first and second elastic portions 341 and 342 allows the first spacer 31 to be inserted among the first and second unit cells 11 and 12. Once insertion is complete, the first spacer 31 exerts an elastic force towards unit cells 10 in contact therewith.

Figure 4:
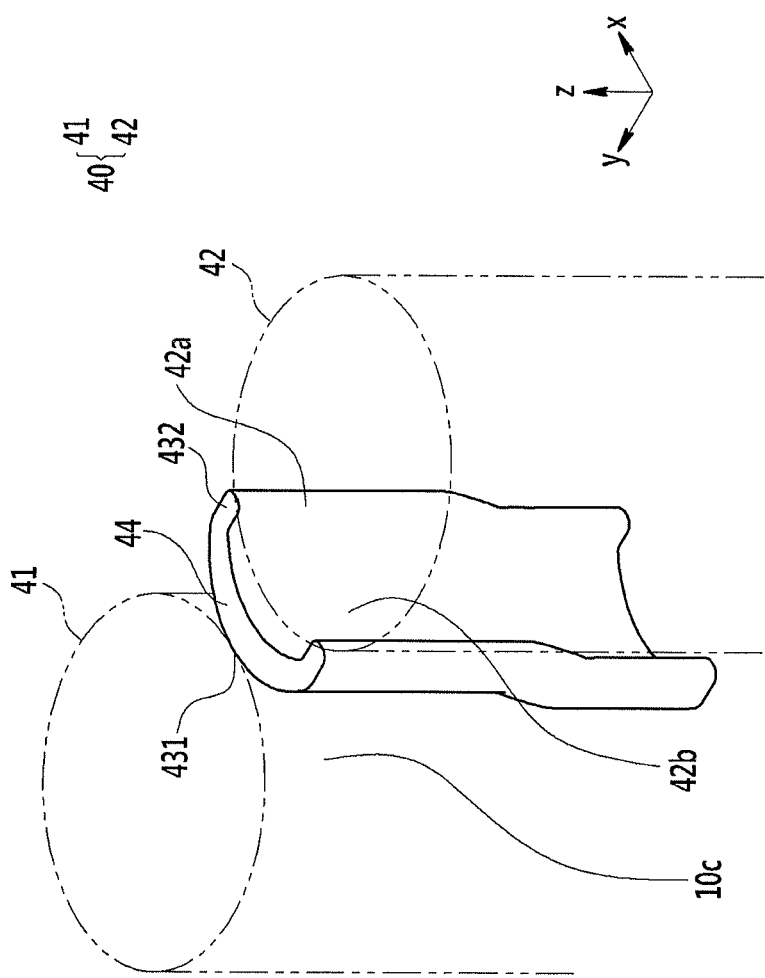
FIG. 4 illustrates an enlarged perspective view of a second spacer coupled to unit cells according to the first embodiment.
Figure 5:
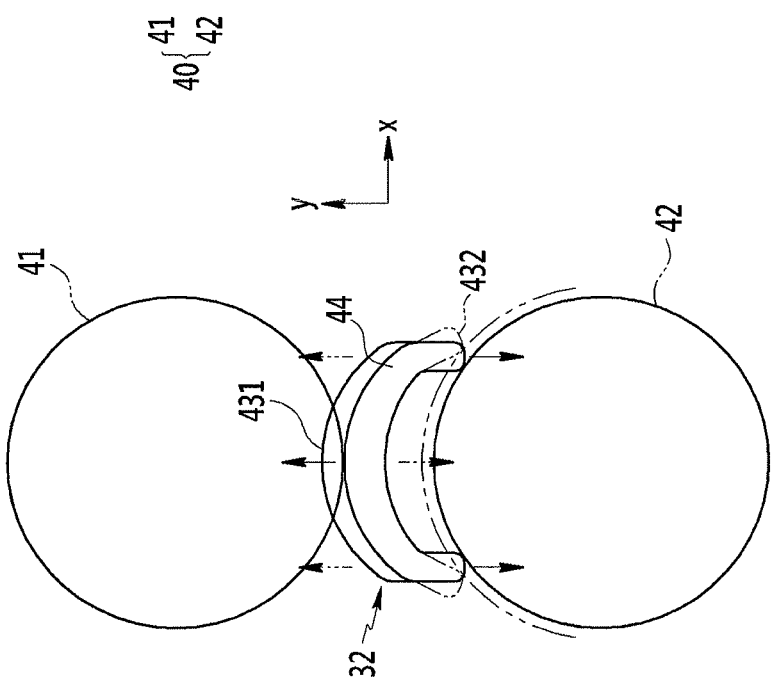
FIG. 5 illustrates a view of an operating state of the second spacer in FIG. 4.

FIG. 4 is a perspective view of a coupled state of the second spacer 32 and the unit cells 40 of FIG. 1. FIG. 5 is a view showing an operating state of the second spacer 32 shown in FIG. 4. The second spacer 32 supports the unit cells 40. In this case, the unit cells 40 include a first unit cell 41 and a second unit cell 42.

Referring back to FIG. 1, the unit cells 40 may be repeatedly arranged in the case 20, so a predetermined number of unit cells 40 may be arranged along the y-axis, e.g., along two symmetrical positions adjacent along the y-axis. Referring to FIG. 4 and FIG. 5, the unit cells 40 may be arranged to have the first unit cell 41 at one of the two positions and the second unit cell 42 at the other position.

The second spacer 32 may include a first compressing portion 431 and a second compressing portion 432 that are disposed on both sides of the y-axis direction to compress the first unit cell 41 and the second unit cell 42, and an elastic portion 44 elastically connecting the first and second compressing portions 431 and 432.

In detail, as illustrated in FIG. 4, the first compressing portion 431 may be a curved portion protruding along the y-axis direction away from a center of the second spacer 32, e.g., the first compressing portion 431 may curve away from the second unit cell 42 toward the first unit cell 41. The first compressing portion 431 may support a center of a side surface 10c of the first unit cell 41, e.g., the first compressing portion 431 may be tangent to the first unit cell 41 along the center of the side surface 10c of the first unit cell 41. The second compressing portion 432 may be connected to the elastic portion 44 on both sides of the first compressing portion 431 along the x-axis direction, and may protrude away from the first compressing portion 431. In other words, the second compressing portion 432 may extend in an opposite direction with respect to the direction of the first compressing portion 431, so the second compressing portion 432 may contact and support a side surface of the second unit cell 42. The second compressing portion 432 may be positioned symmetrically with respect to the first compressing portion 431, so the second compressing portion 432 may contact first and second regions 42a and 42b on the second cell unit 42 at both sides relative to the surface contact of the first unit cell 41 with the first compressing portion 431. Therefore, the first compressing portion 431 presses the first unit cell 41 along the y-axis, and the second compressing portions 432 presses the second unit cell 42 along the y-axis (see the solid arrow in FIG. 5)

When the second spacer 32 is inserted between the first and second unit cells 41 and 42, the first compressing portion 431 retracts (see the dotted arrow in FIG. 5) and the second compressing portions 432 supported by the elastic portion 44 widen, i.e., protrude away from the first compressing portion 431 along the x-axis (see dashed lines in FIG. 5). That is, the deformation of the elastic portion 44 allows the second spacer 32 to be inserted between the first and second unit cells 41 and 42.

Hereinafter, various exemplary embodiments will be described. The explanation about parts identical to those of the first exemplary embodiment will be omitted, and parts different from those of the first exemplary embodiment will be described.

Figure 6:
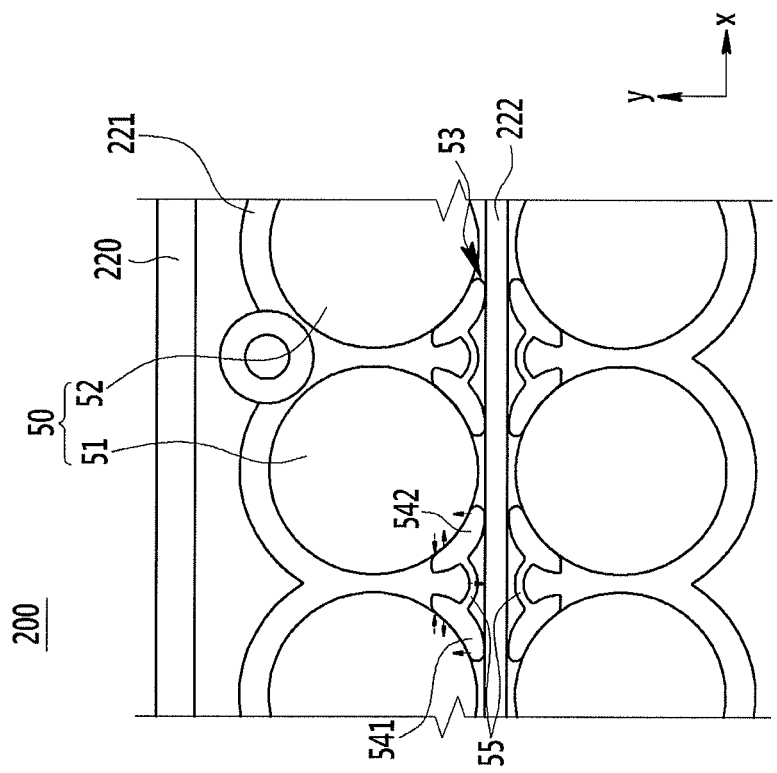
FIG. 6 illustrates a partial top plan view of a rechargeable battery pack according to a second exemplary embodiment.

FIG. 6 is a top plan view of a rechargeable battery pack 200 according to a second exemplary embodiment. Referring to FIG. 6, the rechargeable battery pack 200 may include a plurality of unit cells 50 arranged into groups within a case 220. For example, the unit cells 50 may be arranged into pairs, so two unit cells 50 may be symmetrically spaced apart along the x-axis. That is, a first unit cell 51 may be arranged at one of the two positions, and a second unit cell 52 may be arranged at the other position, i.e., spaced apart along the x-axis from the first unit cell 51.

A spacer 53 may include a first compressing portion 541 and a second compressing portion 542, and an elastic portion 55 connecting the first and second compressing portions 541 and 542. The first and second compressing portions 541 and 542 may be oriented to press the first unit cell 51 and the second unit cell 52 in opposite directions along the x-axis, and also press the first unit cell 51 and the second unit cell 52 substantially in a same direction along the y-axis (see the solid arrows in FIG. 6). The elastic portion 55 connects the first compressing portion 541 and the second compressing portion 542 along the x-axis, and is configured to have a curved shape that is convex away from the unit cells 50.

Therefore, when the spacer 53 is inserted between the first and second unit cells 51 and 52, the elastic portion 55 retracts, i.e., is pushed along the y-axis away from the unit cells 50 (see downward pointing arrow in FIG. 6), and the first and second compressing portions 541 and 542 are pushed toward each other (see dotted arrows in FIG. 6). That is, the deformation of the elastic portion 55 allows the spacer 53 to be inserted between the first and second unit cells 51 and 52. Once the spacer 53 is positioned between the first and second unit cells 51 and 52, the elastic portion 55 is released, i.e., the elastic portion 55 reverts to its original form, thereby causing the first and second compressing portions 541 and 542 push the first and second unit cells 51 and 52 in the directions indicated by the solid arrows in FIG. 6.

In this case, the first support 221 in the case 220 may be positioned on opposite sides of the spacer 53 along the y-axis, e.g., the unit cells 50 may be compressed between the support 221 and the spacers 53 along the y-axis, and may be formed to correspond to, e.g., surround, and support the unit cells 50. When the unit cells 50 are repeatedly arranged in the x and y-axis directions, a second support 222 for supporting the spacer 53 may be further provided, e.g., the second support 222 may be positioned between two spacers 53 along the y-axis. For example, the spacer 53 may be positioned between the second support 222 and the unit cells 50.

Figure 7:
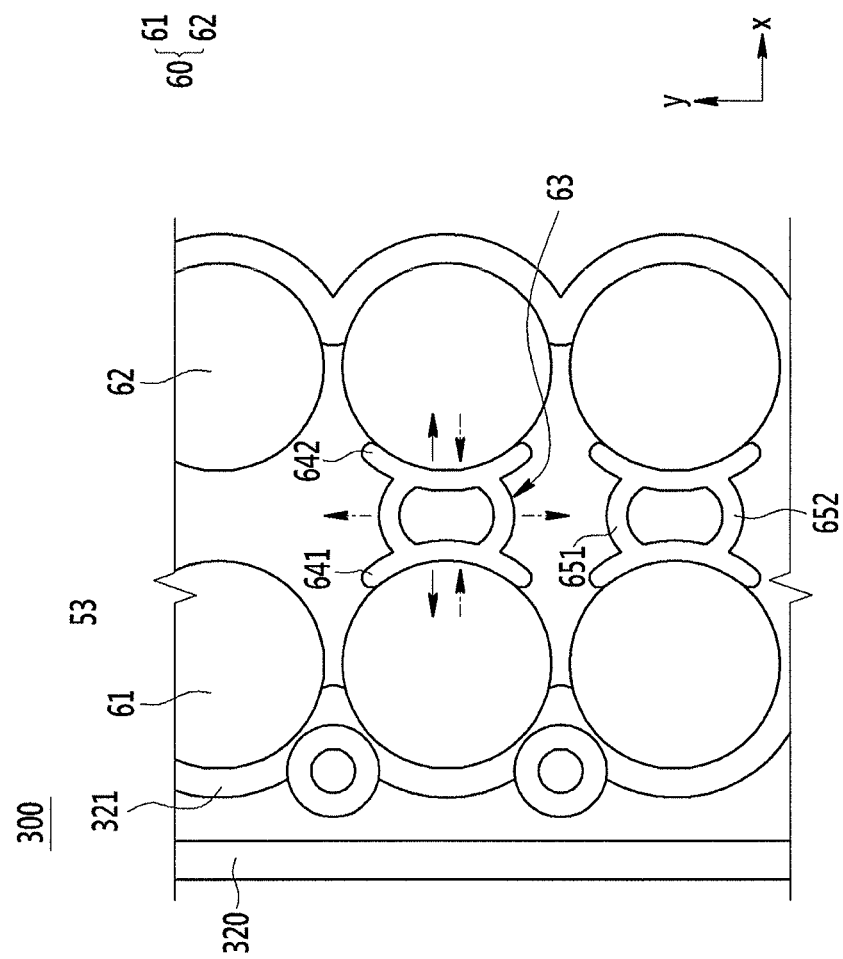
FIG. 7 illustrates a partial top plan view of a rechargeable battery pack according to a third exemplary embodiment.

FIG. 7 is a top plan view of a rechargeable battery pack 300 according to a third exemplary embodiment. Referring to FIG. 7, the rechargeable battery pack 300 may include a plurality of unit cells 60 arranged into groups. For example, the unit cells 60 may arranged into pairs, so two unit cells 60 may be symmetrically spaced apart along the x-axis. That is, a first unit cell 61 may be arranged at one of the two positions, and a second unit cell 62 may be arranged at the other position.

A spacer 63 may include a pair of first and second compressing portions 641 and 642 for supporting the first and second unit cells 61 and 62, and a pair of first and second elastic portions 651 and 652 connecting the pair of first and second compressing portions 641 and 642. The first and second compressing portions 641 and 642 may be spaced apart from each other along the x-axis, and may press the first unit cell 61 and the second unit cell 62 away from each other along the x-axis (see the solid arrows in FIG. 7).

The first and second elastic portions 651 and 652 may be symmetrically spaced apart from each other along the y-axis direction. The first elastic portion 651 connects the portions of the first and second compressing portions 641 and 642 that face each other along the x-axis, and is configured to have a curved shape that is concave with respect to the center of the spacer 63. The second elastic portion 652 connects portions of the first and second compressing portions 641 and 642 that face each other, and is configured to have a curved shape that is concave with respect to the center of the spacer 63. Therefore, when the spacer 63 is inserted between the first and second unit cells 61 and 62, the first and second elastic portions 651 and 652 retract as the first and second compressing portions 641 and 642 retract to the center of the spacer 63 (see the dotted arrows in FIG. 7). That is, the deformation of the elastic portions 651 and 652 allows the spacer 63 to be inserted between the first and second unit cells 61 and 62.

In this case, a support 321 of a case 320 may be positioned on both opposite sides of the spacer 63 along the y-axis, and may be configured to correspond to and support the unit cells 60.

Figure 8:
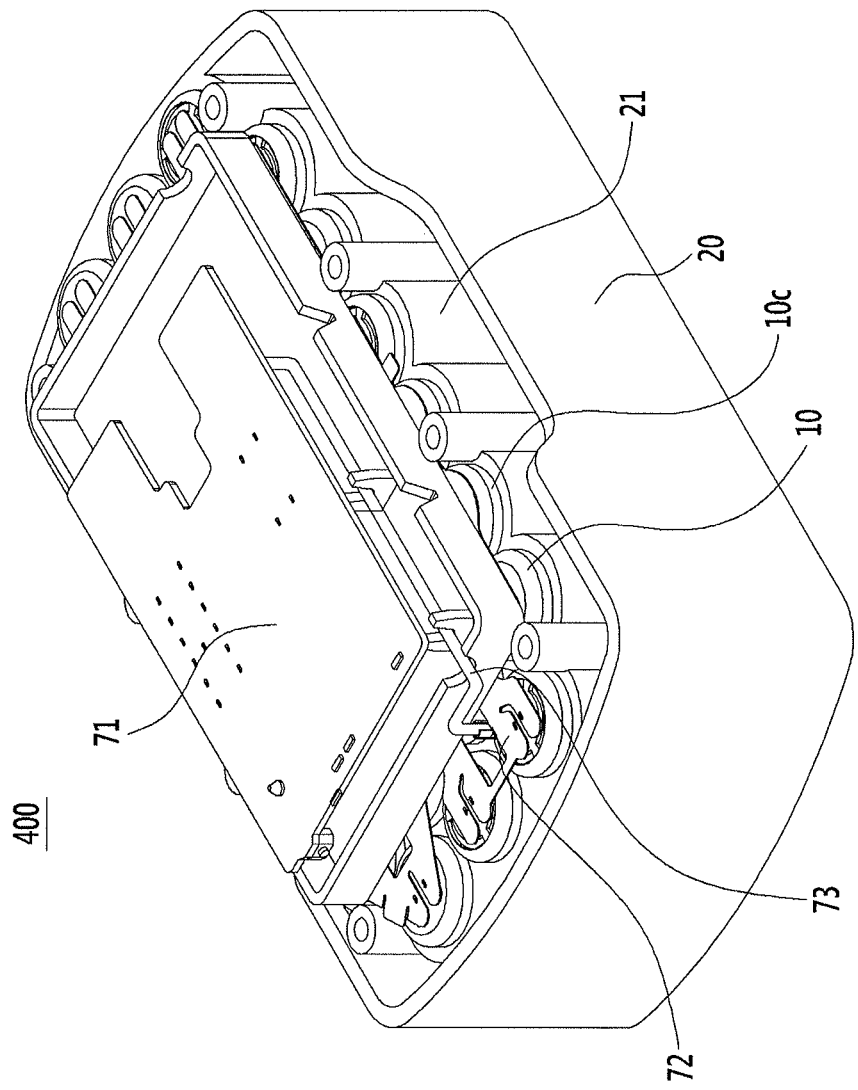
FIG. 8 illustrates a perspective view of a rechargeable battery pack according to a fourth exemplary embodiment.

FIG. 8 is a perspective view of a rechargeable battery pack 400 according to a fourth exemplary embodiment. Referring to FIG. 8, the rechargeable battery pack 400 may include a PCM 71 having a protection circuit of the unit cells 10, a connection tab 72 for electrically connecting the unit cells 10, and a cable 73 for connecting the PCM 71 to the connection tab 72.

Figure 9:
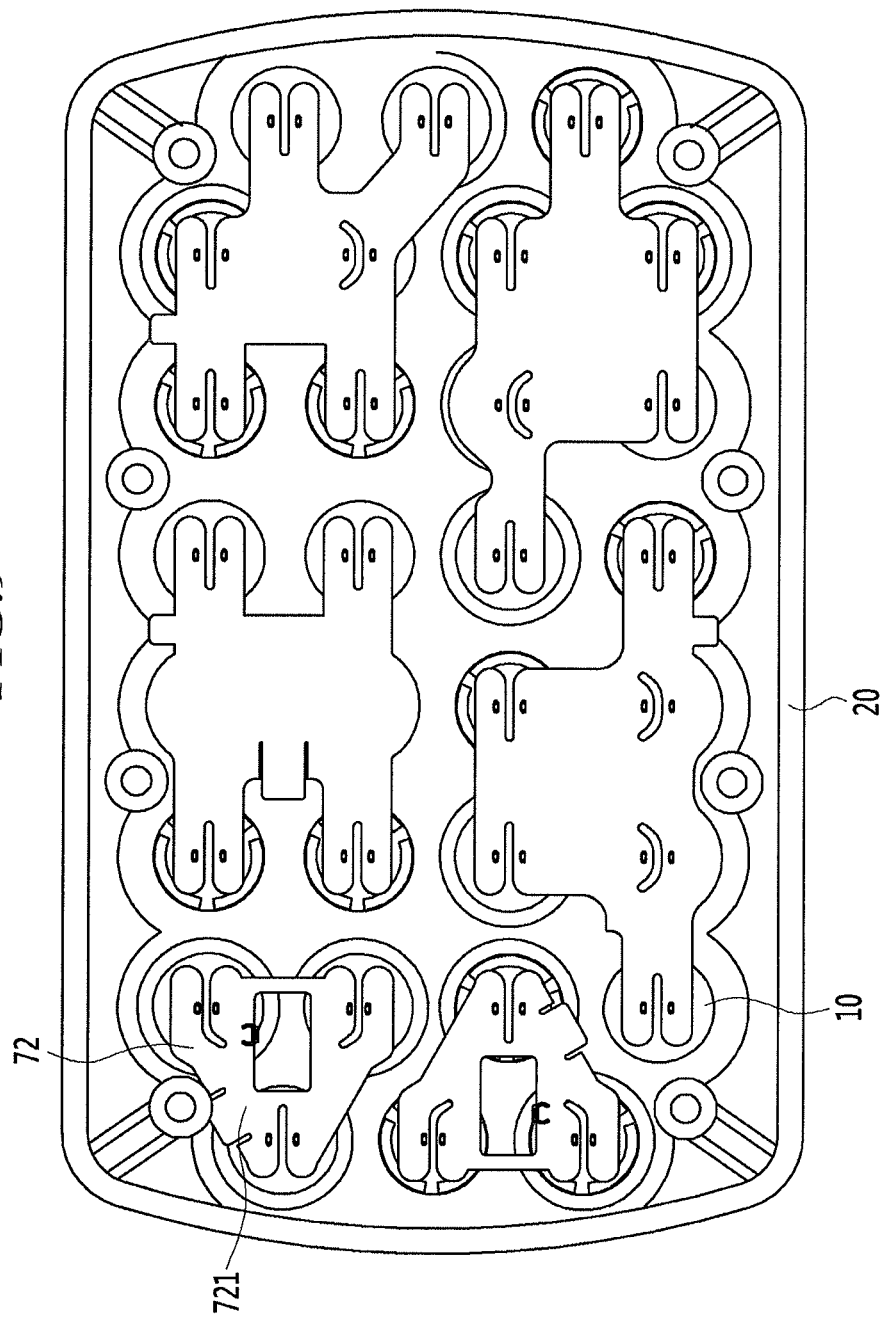
FIG. 9 illustrates a top plan view of the welding of a connection tab to unit cells in FIG. 8.
Figure 10:
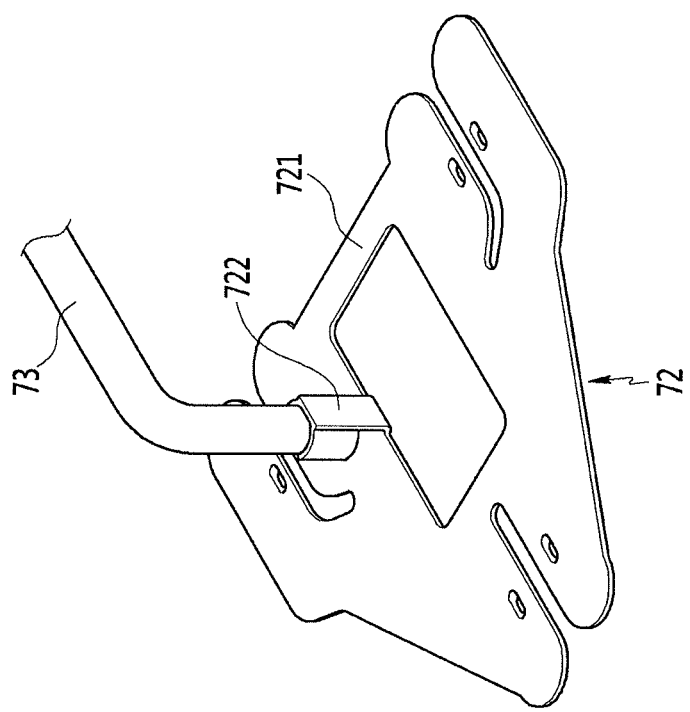
FIG. 10 illustrates a detailed perspective view of the connection tab in FIG. 9.

FIG. 9 is a top plan view of the welding of the connection tab 72 to the unit cells 10 in FIG. 8. FIG. 10 is a detailed perspective view of the connection tab 72. Referring to FIGS. 8-10, the connection tab 72 may be formed in singularity or plurality depending on the arrangement of the unit cells 10. The present exemplary embodiment involves the connection tab 72, which is connected to the cable 73 that is used to connect the unit cells 10 to the PCM 71.

The connection tab 72 includes a plate 721 welded and electrically connected to the unit cells 10 and a clamp 722 protruding from the plate 721 and for clamping the cable 73. The clamp 722 is formed integrally with the plate 721 by partially cutting and bending the plate 721, and protrudes in an upright position on the plate 721.

By providing the clamp 722 at the connection tab 72, the rechargeable battery pack 400 of the fourth exemplary embodiment allows the cable 73 connected to the PCM 71 to be connected to the clamp 722 in a clamping manner, after welding the connection tab 72 to the unit cells 10 and mounting the PCM 71 on the unit cells 10.

This clamping of the clamp 722 to the cable 73 makes it possible to freely perform welding of the connection tab 72 to the unit cells 10, and makes the connection of the cable 73 and the connection tab 72 much easier. For example, conventionally, a connection tab may be welded to the unit cells, with the cable and the connection tab welded together. Thus, the welding point between the connection tab and the unit cells may be distorted, or there may be interference between the PCM and the cable. The present exemplary embodiment can solve these problems.

According to an exemplary embodiment, a plurality of unit cells may be housed in a case, and a spacer may be interposed among the plurality of unit cells to stably fix the unit cells. As a result, the unit cells may be prevented from being moved by physical impacts applied from the outside. Accordingly, the rechargeable battery pack may be able to maintain the connection (e.g., welding) between the unit cells and the connection tab, maintain the connection (clamping) between the connection tab and the cable, and stably hold and protect the respective unit cells in the case.

In contrast, a conventional rechargeable battery pack may include a cell holder inserted between the unit cells so as to house the unit cells in a case. The cell holder in the conventional battery pack, however, may have a wider insertion space than the unit cells to properly fix the unit cells in the case in a loose state, i.e., dimensional dispersion may occur due to dimensional tolerance. Therefore, the unit cells in the conventional battery pack may move within the cell holder upon external impacts, e.g., vibration, dropping, or a drum test of the battery pack. Moreover, the rechargeable battery pack may suffer damage to the welding between the unit cells and the connection tab, the connection between the connection tab and the cable, and the unit cells due to the instability, i.e., potential movement, of the unit cells within the case.

<Description of symbols>

10, 40, 50, 60: unit cell
10c: side surface of a unit cell
12, 42, 52, 62: second unit cell
20, 320: case
30, 53, 63, 64: spacer
10a, 10b: electrode terminals
11, 41, 51, 61: first unit cell
42a, 42b: regions on a unit cell
21, 221, 222, 321: support
31, 32: first/second spacers -continued <Description of symbols>

33: compressing portion
71: protection circuit module
73: cable
331, 431, 541, 641: first compressing portion
332, 432, 542, 642: second compressing portion
331a, 331b, 332a, 332b: facing portions of compression portions
341, 651: first elastic portion
721: plate
34, 44, 55: elastic portion
72: connection tab
100, 200, 300, 400: battery pack 342, 652: second elastic portion
722: clamp Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A rechargeable battery pack, comprising:
a plurality of unit cells adjacent each other, each unit cell including a rechargeable battery;
a case to house the unit cells and support side surfaces of the unit cells; and
a spacer compressed among adjacent unit cells, the spacer including an elastic material and exerting an elastic force to support the unit cells, a width of the spacer in an uncompressed state being larger than a width of the compressed spacer inside the case,
wherein the spacer includes:
first and second compressing portions spaced apart from each other along a first direction, and
an elastic portion connecting the first and second compressing portions, the elastic portion including the elastic material and exerting the elastic force to push the first and second compressing portions in opposite directions against adjacent unit cells,
wherein the plurality of unit cells are arranged in groups of four adjacent unit cells symmetrical with respect to an intersection of the first direction and a second direction orthogonal to the first direction,
wherein each of the first and second compressing portions pushes away along the first direction two corresponding unit cells of the four adjacent unit cells in a group from the remaining two unit cells of the four adjacent unit cells in the group,
wherein each of the first and second compressing portions pushes the two corresponding unit cells away from each other along the second direction, and
wherein the spacer contacts only the four unit cells in the group of four adjacent unit cells, the spacer being separate from an adjacent spacer in an adjacent group of four unit cells.
2. The rechargeable battery pack as claimed in claim 1, wherein the case includes a support corresponding to side surfaces of outermost unit cells, the outermost unit cells being supported by and compressed between the support and the spacer.

3. The rechargeable battery pack as claimed in claim 1, wherein:
the first compressing portion has a shape of a wedge and is inserted in a gap between first unit cells, the first unit cells being two unit cells of the four unit cells adjacent to each other along the second direction; and
the second compressing portion has a shape of a wedge inserted in a gap between second unit cells, the second unit cells being two unit cells of the four unit cells and adjacent to the first unit cells along the first direction.

4. The rechargeable battery pack as claimed in claim 1, wherein:
the elastic portion includes a first elastic portion and a second elastic portion, the first and second elastic portions being symmetrically spaced apart from each other in the second direction,
the first elastic portion is curved and connects first facing portions of the first compressing portion and the second compressing portion along the first direction, the first elastic portion being convex with respect to a center of the spacer, and
the second elastic portion is curved and connects second facing portions of the first compressing portion and the second compressing portion along the first direction, the second elastic portion being convex with respect to the center of the spacer and curving in an opposite direction with respect to the first elastic portion.

5. The rechargeable battery pack as claimed in claim 1, wherein:
the plurality of unit cells are arranged in groups of two adjacent unit cells symmetrical with respect to the first direction, and
each of the first and second compressing portions pushes the two adjacent unit cells in each group away from each other along the first direction, and to push the two adjacent unit cells in each group in parallel along the second direction, the second direction being orthogonal to the first direction.

6. The rechargeable battery pack as claimed in claim 5, wherein the elastic portion is curved and connects the first compressing portion and the second compressing portion along the first direction, the elastic portion curving away from the unit cells.

7. The rechargeable battery pack as claimed in claim 1, wherein:
the plurality of unit cells are arranged in groups of two adjacent unit cells symmetrical with respect to the first direction, and
each of the first and second compressing portions pushes the two adjacent unit cells in each group away from each other along the first direction.

8. The rechargeable battery pack as claimed in claim 7, wherein:
the elastic portion includes a first elastic portion and a second elastic portion that are symmetrically spaced apart from each other along the second direction orthogonal to the first direction,
the first elastic portion connects first facing portions of the first compressing portion and the second compressing portion along the first direction by a first curve, the first curve being concave with respect to a center of the spacer, and
the second elastic portion connects second facing portions of the first compressing portion and the second compressing portion along the first direction by a second curve, the second curve being concave with respect to the center of the spacer.

9. The rechargeable battery pack as claimed in claim 1, further comprising:
a protection circuit module having a protection circuit of the unit cells;
a connection tab electrically connecting the unit cells; and
a cable connecting the protection circuit module to the connection tab.

10. The rechargeable battery pack as claimed in claim 9, wherein the connection tab includes a plate electrically connected to the unit cells, and a clamp protruding from the plate and clamping the cable.

11. The rechargeable battery pack as claimed in claim 10, wherein the clamp is integral with the plate and protrudes in an upright position on the plate.

12. The rechargeable battery pack as claimed in claim 1, wherein the spacer includes a spring.

13. The rechargeable battery pack as claimed in claim 1, further comprising a support within the case, each unit cell being positioned between a portion of the support and a portion of the spacer.

14. The rechargeable battery pack as claimed in claim 1, wherein:
the plurality of unit cells are spaced apart from each other along a first direction and along a second direction perpendicular to the first direction, one compressed spacer being positioned to directly and simultaneously contact at least two adjacent unit cells of the plurality of unit cells; and
a width of the one compressed spacer in the uncompressed state along at least one of the first and second directions is larger than a distance between the at least two adjacent unit cells of the plurality of unit cells along at least one of the first and second directions, respectively.

15. The rechargeable battery pack as claimed in claim 14, wherein:
the one compressed spacer directly and simultaneously contacts four adjacent unit cells of the plurality of unit cells; and
a portion of the one compressed spacer is in a space between every two adjacent unit cells of the four adjacent unit cells, a width of the portion of the one compressed spacer in the uncompressed state along at least one of the first and second directions being larger than a width of the corresponding space along at least one of the first and second directions, respectively.

16. The rechargeable battery pack as claimed in claim 1, wherein:
each one of the unit cells of the plurality of unit cells is directly on a bottom of the case, a longitudinal direction of each unit cell of the plurality of unit cells being perpendicular to the bottom of the case; and
the spacer extends in parallel to the longitudinal direction of the unit cells and is surrounded by at least two of the plurality of unit cells, the spacer being suspended only by elastic force between uppermost surfaces of the unit cells and a bottom of the case.

17. The rechargeable battery pack as claimed in claim 16, wherein a topmost surface of the spacer is at a same height or lower than topmost surfaces of the unit cells, and a length of the spacer is shorter than a length of the unit cells along the longitudinal direction of the unit cells.

* * * * *